United States Patent [19]

Graziosi

[11] 4,000,409
[45] Dec. 28, 1976

[54] COMBINATION SWITCH LOCK FOR A MOTOR VEHICLE IGNITION SYSTEM

[76] Inventor: Michael Graziosi, 383 Second St., Jersey City, N.J. 07601

[22] Filed: July 22, 1974

[21] Appl. No.: 490,561

[52] U.S. Cl. .......................... 307/115; 307/10 AT; 317/134; 200/45

[51] Int. Cl.² ........................................ B60R 25/00

[58] Field of Search .................... 307/10 AT, 115; 180/114; 317/134; 340/63, 64, 65; 200/45

[56] References Cited

UNITED STATES PATENTS

| | | | |
|---|---|---|---|
| 2,162,995 | 6/1939 | Bruington | 200/45 |
| 3,611,287 | 10/1971 | Hoff | 307/10 AT |
| 3,754,148 | 8/1973 | Nye | 307/10 AT |

*Primary Examiner*—Herman J. Hohauser
*Attorney, Agent, or Firm*—Kirschstein, Kirschstein, Ottinger & Frank

[57] ABSTRACT

A combination switch lock for a motor vehicle ignition system, having a multiplicity of switches, a predetermined number of which are in series with the ignition circuit. The ignition circuit is completed only when a series of predetermined switches are closed. A bypass circuit is provided for use during emergencies or when the switches have been tampered with.

1 Claim, 5 Drawing Figures

U.S. Patent     Dec. 28, 1976     4,000,409
FIG. 1
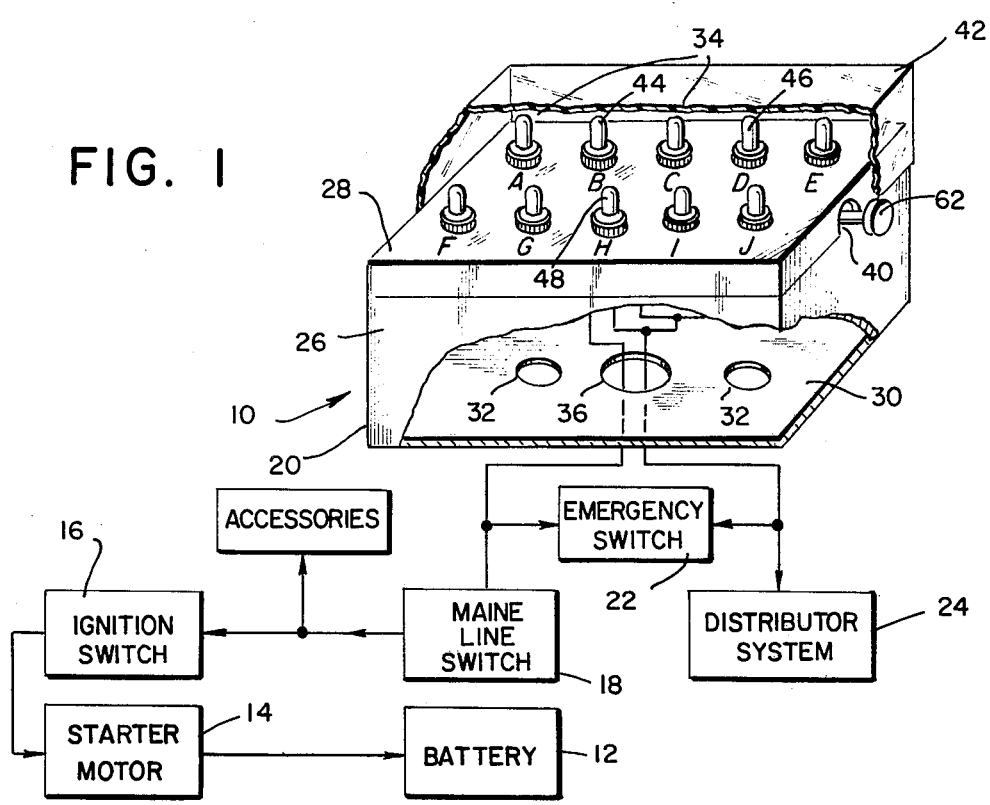
FIG. 2
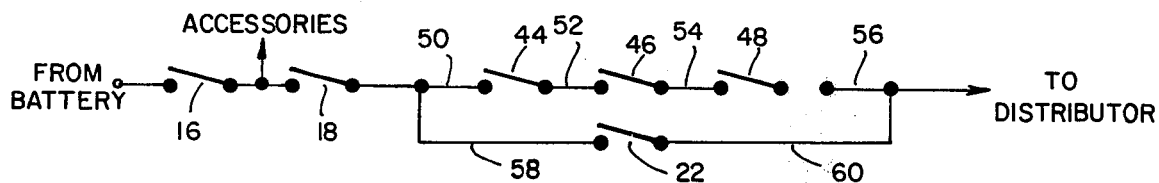
FIG. 3
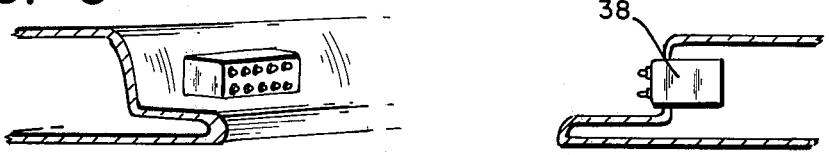
FIG. 4
FIG. 5
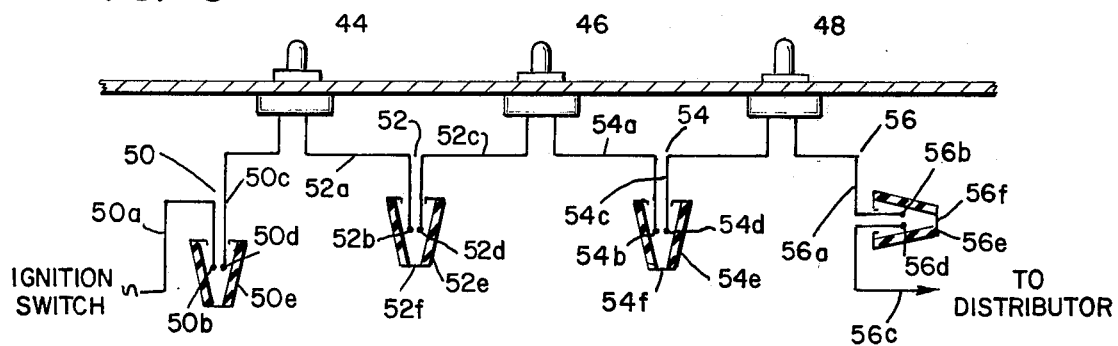

COMBINATION SWITCH LOCK FOR A MOTOR VEHICLE IGNITION SYSTEM

BACKGROUND OF THE INVENTION

1. Field of the Invention

The present invention relates to a combination switch lock and more particularly a combination switch lock which can be used in a motor vehicle ignition system.

2. Prior Art

Heretofore key-operated ignition switches were the most common method for preventing the unauthorized use of a motor vehicle. Theoretically, only those individuals authorized to use the motor vehicle would have access to the ignition keys. Unfortunately, the ignition keys are often taken by unauthorized persons, or left in the ignition switch when the motor vehicle engine is turned off and the motor vehicle left unattended. Unauthorized persons are then provided a means by which they may use the motor vehicle.

It is toward the elimination of this problem that this invention is directed.

SUMMARY OF THE INVENTION

It is, therefore, an object of the present invention to provide a combination switch lock device for a motor vehicle ignition system to prevent unauthorized use of the motor vehicle by requiring a predetermined number of switches to be closed before the ignition circuit is completed.

Another object of the present invention is to provide a combination switch lock device which will prevent the motor vehicle from being started even if the ignition key is left in the ignition switch.

Yet another object of the present invention is to provide a combination switch lock device which will permit the use of other electrical equipment in the motor vehicle when the ignition switch is turned to the accessory position.

A further object of the present invention is to provide a combination switch lock device having a bypass circuit that is used in an emergency or, in the case where the switches have been tampered with, that will permit the ignition circuit to be closed.

Generally speaking, in accordance with the present invention the foregoing and other objects are achieved by a combination switch lock device consisting of a multiplicity of switches mounted to an enclosed housing. To start an auto a predetermined number of these switches are set in series with the ignition system of the motor vehicle. The remaining switches are not connected in this circuit. When the operator wishes to start the vehicle he closes the predetermined switches which complete a portion of the ignition circuit. Once the ignition key is turned the ignition circuit is completed and the motor vehicle engine will start. An auxiliary switch is provided to bypass the switch lock mechanism in case of an emergency or in case the switches have been tampered with.

Still other objects and advantages of the invention will in part be obvious and will in part be apparent from the specifications.

The invention, accordingly, consists in the features of construction, combinations of elements and arrangement of parts, which will be exemplified in the combination switch lock hereinafter described and of which the scope of application will be indicated in the appended claims.

BRIEF DESCRIPTION OF THE DRAWINGS

For a better understanding of the present invention, reference should be had to the accompanying drawings, wherein like numerals of reference indicate similar parts throughout the several views and wherein:

FIG. 1 is a perspective partial sectional view of the combination switch lock device constructed in accordance with the invention, with the ignition circuitry shown symbolically;

FIG. 2 is a symbolic representation of the portion of the ignition circuit;

FIG. 3 is a perspective view of a motor vehicle dashboard showing the combination switch lock device mounted thereon;

FIG. 4 is a perspective view of a motor vehicle dashboard showing an alternative method of mounting the combination switch lock device; and FIG. 5 is a partial sectional view of the wiring within the combination switch lock device.

DESCRIPTION OF THE PREFERRED EMBODIMENT

As can be seen in FIG. 1, the motor vehicle ignition system is generally indicated by reference numeral 10. The system includes in part a battery 12, a starter motor 14, an ignition switch 16, a mainline switch 18, a combination switch lock device 20, an emergency bypass switch 22, and a distributor system 24. The ignition system 10 generally decribed, with the exception of the mainline switch 18, the combination switch lock device 20, and the bypass switch 22, comprises the standard ignition system provided for most internal combustion engines and does not form a part of the present invention.

In order to provide a means to install the combination switch lock device in a motor vehicle, the combination switch lock device 20 consists of a housing 26 having a top wall 28 and a bottom wall 30. The housing 26 is represented in FIG. 1 as being generally rectangular in shape but it is to be understood that the housing can be of any shape that is aesthetically pleasing when mounted in the motor vehicle and may be specification shaped to fit into a designated area within the motor vehicle. The bottom wall 30 is provided with openings 32 to accommodate appropriate mounting means (not shown) for fastening the housing to the interior of the motor vehicle. While the combination switch lock device 20 can be mounted to the dashboard of the motor vehicle, the device may be placed anywhere in the motor vehicle within easy access of the operator of the motor vehicle and where it can be most conveniently wired into the ignition circuit.

Mounted on the top wall 28 are a multiplicity of circuit closing elements or non-indicating switches 34. It is to be understood that, although ten of these switches are shown being arranged in two columns of five, the invention is not limited to such a number or orientation and the switches 34 can be of any number sufficient to fulfill the requirements of the combination and arranged in any manner that would accommodate the overall appearance of the housing 26. In order to allow the switches 34 to be wired into the ignition system, opening 36 is provided in the bottom wall 30 of the housing 26 so that the wiring can remain within the housing and not be readily accessible.

The device described above is adapted to be mounted on a flat surface in the interior of the motor vehicle as shown in FIG. 3. An alternative method of mounting is shown in FIG. 4 wherein a cover plate 38 is mounted over an opening flush to an internal surface of the motor vehicle such as the dashboard and the switches 34 are mounted thereto.

The top wall 28 may be releasably mounted to the housing 26 by providing mounting screws 62 disposed at opposite ends of the housing 26 which cooperate with slots 40 located in the top surface 28.

If desired, the combination switch lock device may be provided with a removable cover 42 to prevent dust from intefering with the operating of the switches.

While the above discussion concerned itself with the overall physical characteristics of the combination switch lock device, the operation of the combination switch lock device in the ignition system will be hereinafter described. Each of the non-indicating switches 34 can be identified by a different letter or number. As shown in FIG. 1, each of the switches is identified by a letter. From a multiplicity of these switches a predetermined number are connected in series to the ignition system.

In the following discussion three switches from the ten switches have been selected as the active switches in the combination. The remaining seven switches are passive and act as decoys. The three switches identified as B, D and H mounted to the top wall 28 bear, respectively, reference numerals 44, 46 and 48. Switches 44, 46 and 48 are of the non-indicating push type switch so that an unauthorized individual attempting to start the motor vehicle has no way of knowing whether the switch is in the on or off position. Also, if an indicating type switch were used, such as the ordinary toggle type switch, the position of the switch would be visible to an onlooker when the vehicle was in operation. Since he would then know which switches were on, it would supply him with the code combination which would render the switch lock device ineffective.

In the schematic diagram shown in FIG. 2 the switch 44 is connected into the ignition system by means of a wire member or wire 50. The switch 46 is connected in series to switch 44 by means of the wire member or wire 52 and in turn switch 48 is connected in series to switch 46 by means of the wire member or wire 54. Finally, the switch 48 is connected into the ignition system by means of wire member 56 and, as previously indicated, wire 50. Thus, it can be seen when all the switches 44, 46 and 48 are closed, that portion of the circuit within the combination switch lock device will be completed. When the ignition switch 16 and the mainline switch 18 are closed the ignition circuit is completed in the wellknown manner and the motor vehicle engine will start.

The first time the motor vehicle having the combination switch lock device is used the above procedure is followed. However, in subsequent use in order to provide an effective device for preventing unauthorized use of the motor vehicle a slight variation of the above procedure is to be followed. When the ignition switch 16 is turned to the off position and switches 46 and 48 are open, switch 44 is left in the closed position. This procedure is followed to prevent an unauthorized person from gaining access to the auto and switches and pressing all of them in the hopes of completing the circuit. Obviously, if switch 44, switch 46 and switch 48 were all put in the off position, an unauthorized person, by arbitrarily depressing all of the buttons on the switch lock device would necessarily put switches 44, 46 and 48 in the closed position, thus completing that portion of the circuit within the device. If the switch 44 is left in the closed position when the unauthorized person depresses all of the switches, he will put switches 46 and 48 into the closed position, switch 44 being into the position, thereby breaking that portion of the circuit in the device and preventing the ignition system from being completed. It is therefore apparent that this device provides a simple yet extremely effective means for preventing the unauthorized ignition and use of a motor vehicle.

When there are some outward signs that the combination switch lock device or that the vehicle itself has been tampered with and the motor vehicle engine fails to start when switches 46 and 48 are depressed, it may be necessary to reset the switches. This is particularly true if an unauthorized person has depressed an undetermined number of the switches in the device and one of the predetermined switches in series with the ignition circuit is in that group. The authorized driver will have no way of knowing which of the predetermined switches have been depressed and he will have difficulty in completing the ignition circuit. To negate this condition the user will have to reset the switches in the combination switch lock device 20 by making a simple test of the circuit.

The top wall 28 of the housing 26 is removed to provide access to the interior of the housing and to the wires 50, 52, 54 and 56. As may be seen in FIG. 5, each of the wires 50, 52, 54 and 56 is made up of several elements. The wire 50 is provided with an interruption which is composed of a first wire 50a having a bare tip 50b, a second wire 50c having a bare tip 50d and a wire connector 50e. Wire 52 is also provided with an interruption and is made up of a first wire 52a having a bare tip 52b, a second wire 52c having a bare tip 52d and a wire connector 52e with a hole 52f. Similarly, wire 54 has an interruption having a first wire 54a with a bare tip 54b, a second wire 54c having a bare tip 54d and a wire connector 54e with a hole 54f. Wire 56 is provided also with a first wire 56a with a bare tip 56b, a second wire 56c with a bare tip 56d and wire connector 56e with a hole 56f.

The first wire 50a is removed from the connector 50e and inserted into the hole 56f in the wire connector 56e and the bare tip 50b of the first wire 50a will come into contact with the bare tip 56d of wire 56c. When the ignition switch 16 and the mainline switch 18 are closed the motor vehicle engine should start because the ignition system circuit has been completed since the switches 44, 46 and 48 have been bypassed.

The first wire 50a is then removed from the connector 56f and inserted into the hole 54f in connector 54e, where the bare tip 50d will contact bare tip 54d of second wire 54c. The ignition switch 16 and mainline switch 18 are then closed. If the motor vehicle engine fails to start, it is an indication that switch 48 is in the open position since the ignition system circuit is not completed. The switch 48 is then depressed, which will put it in the closed position.

The first wire 50a is then removed from the connector 54e and inserted into the hole 52f of connector 52e, where the tip 50d will contact the bare tip 52d of second wire 52c. If the motor vehicle engine fails to start when ignition switch 16 and mainline switch 18 are closed, switch 46 is in the open position. When switch 46 is closed, the ignition system circuit is completed and the engine will start.

Finally, first wire 50a is removed from the hole 52f and reconnected to the second wire 50c by means of connector 50e. Once again, if the ignition switch 16 and mainline switch 18 are closed and the motor vehicle fails to start, switch 44 must be put into the closed position to complete the ignition circuit. Having reset the switches in the combination switch lock device, the device can be operated as hereinabove described.

If circumstances do not permit the operator to reset the switches, an emergency bypass switch 22 is provided which when closed will complete a bypass circuit around the combination switch lock device. As shown in FIG. 1, the emergency switch 22 is indicated schematically as being outside the housing 26. The emergency switch 22 can be mounted anywhere on the motor vehicle and in order to prevent an unauthorized person from defeating the combination switch lock device, it should be hidden from view. The emergency switch 22 may also be mounted within the housing 26 and accessible only with a special lock and key arrangement, not shown.

In order to provide an additional preventive measure for unauthorized use of the motor vehicle, the mainline switch 18 is placed in the circuit. Unless mainline 18 is closed, the ignition circuit will not be completed even if the ignition switch 16 is closed and either the switches 44, 46 and 48 in the combination switch lock device or the emergency switch 22 is closed. In FIG. 1 the mainline switch 18 is schematically shown being outside of the combination switch lock device. In this case the switch can be mounted in some inconspicuous place in the motor vehicle. It is to be understood, however, that the mainline switch device may be mounted to the combination switch lock device in such a manner that it will be conspicuous but will be readily accessible.

Since the mainline switch 18 and the combination switch lock device are not in the motor vehicle accessory circuitry, the accessories may be operated by merely closing the ignition switch into the accessory position.

It will be seen, from the foregoing detailed description, that the object of the invention, namely, to prevent unauthorized use of a motor vehicle has been achieved by providing a special switching arrangement which when utilized as indicated will require a predetermined number of switches to be closed before the ignition circuit is completed.

While in accordance with the patent statutes a preferred and alternative embodiment has been shown in detail, it should be particularly understood that the invention is not limited thereto or thereby.

It thus will be seen that there is provided a combination switch lock device which achieves the various objects of the invention and which is well adapted to meet the conditions of practical use.

What is claimed is:

1. A combination switch lock device for an ignition system circuit of a motor vehicle comprising:
   a. a first set of push-button type switches said switches being of the non-indicating type;
   b. wire members connecting each of said first set of push button type switches in series with one another and connecting a first and a last of said first set of push button type switches to said ignition system circuit, so that said ignition system circuit cannot be completed until each of said first set of push button type switches is closed, said first set of push button type switches being closable in a random manner;
   c. a second set of push button type switches identical to said first set of push button type switches not connected in said ignition system circuit;
   d. support means located in said motor vehicle, said first set of push button type switches and said second set of push button type switches mounted on said support means, said first set of push button type switches interspersed with said second set of push button type switches on said support means, so that said first set of push button type switches cannot be readily distinguished from said second set of push button type switches; and
   e. bypass means for completing said ignition system circuit without having to close said first set of push button type switches including a third set of at least one push button type switch connected in series with said ignition system circuit and parallel to said first set of push button type switches, so that said ignition system circuit may be completed by closing said third set of push button type switches without said first set of push button type switches being closed;
   f. each of said wire members being provided with an interruption breaking said wire member into a first wire and a second wire, each of said wires being provided with an area adapted to freely conduct electricity whereby said first wire of said wire element connecting said first push button type switch to said ignition system circuit may be brought, in seriatum, into contact with said second wires of said wire members connected to said other push button type switches to bypass each particular individual push button type switch so that it can be determined if said particular push button type switch is in a closed or open position, and once said determination is made, said push button type switch may be put in its proper position, to thereby reset said device when an unknown number of said first set of push button type switches, less than the total number of said switches have been placed in a closed position.

* * * * *

UNITED STATES PATENT AND TRADEMARK OFFICE
CERTIFICATE OF CORRECTION

PATENT NO. : 4000409
DATED : December 28, 1976
INVENTOR(S) : MICHAEL GRAZIOSI

It is certified that error appears in the above-identified patent and that said Letters Patent are hereby corrected as shown below:

Cancel in inventor's address, the Zip Code No. 07601 and substitute therefor the Zip Code No. 07302.

Signed and Sealed this

Tenth Day of May 1977

[SEAL]

Attest:

RUTH C. MASON
*Attesting Officer*

C. MARSHALL DANN
*Commissioner of Patents and Trademarks*